United States Patent
Ozaki et al.

[11] Patent Number: 5,793,181
[45] Date of Patent: Aug. 11, 1998

[54] METHOD OF AND APPARATUS FOR FEEDING SCANNED MEDIUM

[75] Inventors: Takao Ozaki; Hisao Ooishi, both of Kanagawa-ken, Japan

[73] Assignee: Fuji Photo Film Co., Ltd., Kanagawa, Japan

[21] Appl. No.: 402,695

[22] Filed: Mar. 13, 1995

[30] Foreign Application Priority Data

| Mar. 24, 1994 | [JP] | Japan | 6-054032 |
| Mar. 28, 1994 | [JP] | Japan | 6-057373 |
| Apr. 11, 1994 | [JP] | Japan | 6-071733 |

[51] Int. Cl.$^6$ ............................................. H02P 7/00
[52] U.S. Cl. ............................................. 318/807; 399/396
[58] Field of Search ............................... 318/798–815; 399/167, 396

[56] References Cited

U.S. PATENT DOCUMENTS

| 4,287,461 | 9/1981 | Promis et al. | 318/603 X |
| 4,739,230 | 4/1988 | Sonobe et al. | 318/138 X |
| 4,933,616 | 6/1990 | Chang et al. | 318/561 |
| 5,121,327 | 6/1992 | Salazar | 318/696 |
| 5,227,850 | 7/1993 | Sato et al. | 355/271 |
| 5,304,907 | 4/1994 | Abe et al. | 318/799 X |
| 5,335,189 | 8/1994 | Takayama et al. | 388/813 |
| 5,349,374 | 9/1994 | Arai et al. | |
| 5,384,631 | 1/1995 | Matsunami | 355/308 |
| 5,530,332 | 6/1996 | Rees | 318/685 |

FOREIGN PATENT DOCUMENTS

| 0360169 | 3/1990 | European Pat. Off. | H04N 1/04 |

OTHER PUBLICATIONS

Patent Abstracts of Japan, vol. 17, No. 600 (P1637), 4 Nov. 1993 *abstract*.
Patent Abstracts of Japan, vol. 14, No. 399 (M1017), 29 Aug. 1990 *abstract*.
Patent Abstracts of Japan, vol. 15, No. 117 (M1095), 20 Mar. 1991 *abstract*.

*Primary Examiner*—Jonathan Wysocki
*Attorney, Agent, or Firm*—Sughrue, Mion, Zinn, Macpeak & Seas, PLLC

[57] ABSTRACT

A feed apparatus for feeding a recorded image or film (scanned medium) in a reading or recording apparatus has a feed drum for feeding the scanned medium and a motor for rotating the feed drum. The rotating states of the feed drum and the motor are detected respectively by a rotary encoder and a frequency generator for feedback control of the feed drum and the motor. The eccentricity of the feed drum is limited to a predetermined value which is calculated according to the following equation:

$$\Delta D = \tfrac{1}{2}\{(T+D)\Delta L/L - 2\Delta T\}$$

where $\Delta D$ represents the predetermined value, $L$ the length of the scanned medium in the auxiliary scanning direction, $\Delta L$ the allowable feed error of the scanned medium in the auxiliary scanning direction, $T$ the thickness of the scanned medium, and $\Delta L$ the thickness variation of the scanned medium. Alternatively, the rotary encoder is capable of outputting an original position signal, and the feed drum is positioned in a predetermined original angular position based on the original position signal each time the scanned medium starts to be fed. Then, the scanned medium is fed by the feed drum which starts rotating from the predetermined original angular position.

5 Claims, 10 Drawing Sheets

METHOD OF AND APPARATUS FOR FEEDING SCANNED MEDIUM

BACKGROUND OF THE INVENTION

1. Field of the Invention

The present invention relates to a method of and an apparatus for feeding a scanned medium in an auxiliary scanning direction by transmitting the rotation of a motor through a speed reducer mechanism to a feed drum to rotate the feed drum for thereby feeding the scanned medium.

2. Description of the Related Art

There have widely been used recording apparatus for recording images on scanned mediums and reading apparatus for photoelectrically reading image information carried on scanned mediums. In each of such recording apparatus and reading apparatus, a light beam emitted from a light beam generator is applied through a light beam deflector and a scanning lens to scan a scanned medium in a main scanning direction, and the scanned medium is fed in an auxiliary scanning direction by an auxiliary scanning feed mechanism for recording an image on or reading an image from the scanned medium.

The auxiliary scanning feed mechanism employs a feed drum that is actuated to rotate for feeding the scanned medium in the auxiliary scanning direction. The feed drum is required to feed the scanned medium in the auxiliary scanning direction at a relatively low speed and with high accuracy. To meet such a requirement, a speed reducer mechanism is coupled between the motor which rotates at a high speed and the drum shaft of the feed drum that needs to be rotated at a low speed. The speed reducer mechanism reduces the rotational speed (e.g., 200 rpm) of the motor to a desired rotational speed (e.g., 0.7 rpm) of the drum shaft.

The speed reducer mechanism is apt to produce a speed error in a low frequency range lower than 1 Hz when the rotational speed is reduced from 200 rpm to 0.7 rpm. Since the speed error caused in the low frequency range by the speed reducer mechanism is converted into a feed error of the feed drum, the scanned medium tends to be fed at an irregular rate in each feed cycle.

If the feed drum of the auxiliary scanning feed mechanism has its drum shaft positioned eccentrically or off-center, then the feed drum is likely to feed the scanned medium over a distance containing an error in the auxiliary scanning direction. For example, as shown in FIG. 16 of the accompanying drawings, if the drum shaft of the feed drum is positioned off-center by 10 μm, then the distance by which the scanned medium is fed by the feed drum contains a feed error of 40 μm at maximum while the feed drum is making one revolution.

When color-separated films of four colors, i.e., cyan, magenta, yellow, and black (C, M, Y, BK) are to be produced using such an auxiliary scanning feed mechanism in a color platemaking process, if the films suffer respective feed errors caused by the auxiliary scanning feed mechanism, then respective images on the films are out of register with each other when superimposed, resulting in a reduction in register accuracy.

It has been practiced in the color platemaking process to place four color-separated images in one plate, sever the color-separated images after the plate has been produced, and use the color-separated images in superimposed relation to each other. In such a practice, it is important that a positional error (absolute positional error) of any optional dot on one film be in an allowable range.

SUMMARY OF THE INVENTION

It is therefore an object of the present invention to provide a simple and inexpensive feed apparatus for feeding a scanning medium in an auxiliary scanning direction while effectively avoiding a feed error which would otherwise be produced by a feed drum.

Another object of the present invention is to provide a method of feeding a scanned medium in an auxiliary scanning direction while effectively avoiding a feed error which would otherwise be produced by a feed drum.

According to the present invention, there is provided a feed apparatus for feeding a scanned medium in an auxiliary scanning direction, comprising a motor, a speed reducer mechanism coupled to the motor, a feed drum coupled to the speed reducer mechanism for being rotated by the motor through the speed reducer mechanism to feed the scanning medium in the auxiliary scanning direction, a drum rotation detector for detecting a rotating state of the feed drum, a control signal generator for generating a motor control signal based on a signal outputted from the drum rotation detector, a motor controller for controlling the motor based on the motor control signal generated by the control signal generator, and a central processing unit for controlling the control signal generator and the motor controller in order to keep a relative feed error at an optional position of the scanned medium fed by the feed drum below a predetermined level.

The feed drum has an eccentricity set to at most a predetermined value which is determined in view of an allowable feed error of the scanned medium in the auxiliary scanning direction and a thickness variation of the scanned medium.

The central processing unit comprises means for determining whether the feed drum has been positioned in a predetermined original angular position based on the signal outputted from the drum rotation detector.

According to the present invention, there is also provided a method of feeding a scanned medium in an auxiliary scanning direction with a feed drum while a light beam deflected in a main scanning direction substantially perpendicular to the auxiliary scanning direction is being applied to the scanned medium to scan the scanned medium, comprising the steps of rotating the feed drum, thereafter, detecting whether the feed drum has been positioned in a predetermined original angular position before the scanned medium is scanned by the light beam, stopping the feed drum against rotation after the feed drum has been detected as being positioned in the predetermined original angular position, establishing the original angular position as a reference position, and starting to scan the scanned medium with the light beam from the reference position.

When the motor is energized, the feed drum is rotated at a relatively low speed through the speed reducer mechanism to feed the scanned medium at a certain feed rate. The rotating state of the feed drum is detected directly by the drum rotation detector, and a motor control signal is generated by the control signal generator based on the signal from the drum rotation detector. The motor is controlled by the motor controller based on the motor control signal. Therefore, the motor is controlled under feedback control based on the actual rotating state of the feed drum, thereby minimizing rotational speed irregularities of the feed drum regardless of the limited accuracy of the speed reducer mechanism.

A rotating state of the motor is also detected, and a signal indicative of the detected rotating state is compared with the motor control signal. A signal indicative of the result of comparison is applied to the motor controller for lowering rotational speed irregularities of the motor itself. In this manner, a feed rate error of the speed reducer mechanism in a low frequency range lower than 1 Hz and a rotational speed error of the motor in a frequency range higher than 1 Hz can simultaneously be reduced.

Even though the feed drum and the motor are controlled to minimize their rotational speed errors, the feed rate of the scanned medium is varied if the feed drum suffers an eccentricity. According to the present invention, the feed apparatus has means for keeping a relative feed error at an optional position of the scanned medium which is fed below a predetermined level. The term "relative feed error" represents the positional deviation or difference between an optional point on a scanning medium, i.e., a point on the scanning medium which corresponds to an optional point on an original image, and a point on another scanned medium which corresponds to the above optional point, when a plurality of scanned mediums are repeatedly fed.

One way of keeping the relative feed error below the predetermined level is to limit the eccentricity of the feed drum below an allowable value. The allowable value for the eccentricity of the feed drum is determined in view of a relative feed error allowed for each scanned medium and a thickness variation of the scanned medium. By thus limiting the eccentricity of the feed drum, rotational speed irregularities of the feed drum are controlled so as to be small by a rotation control system for the feed drum and the motor. Accordingly, the relative feed error between the scanned mediums can be maintained below the predetermined level.

Another way of keeping the relative feed error below the predetermined level is, in repetitive feeding of scanned mediums, to position the feed drum in a predetermined original angular position each time a scanned medium starts being fed, and then starts feeding the scanned medium. To this end, the central processing unit is given a function to determine whether the feed drum has been positioned in the predetermined original angular position based on the signal from the drum rotation detector. The central processing unit, therefore, controls the rotation of the feed drum and determines a condition to start feeding the scanned medium. Since a feed error due to the eccentricity of the feed drum is reflected on each of the scanned mediums under the same conditions even if the eccentricity of the feed drum is not strictly limited, the relative feed error between the scanned mediums can be maintained below the predetermined level.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS (1st Embodiment)

Figure 1:
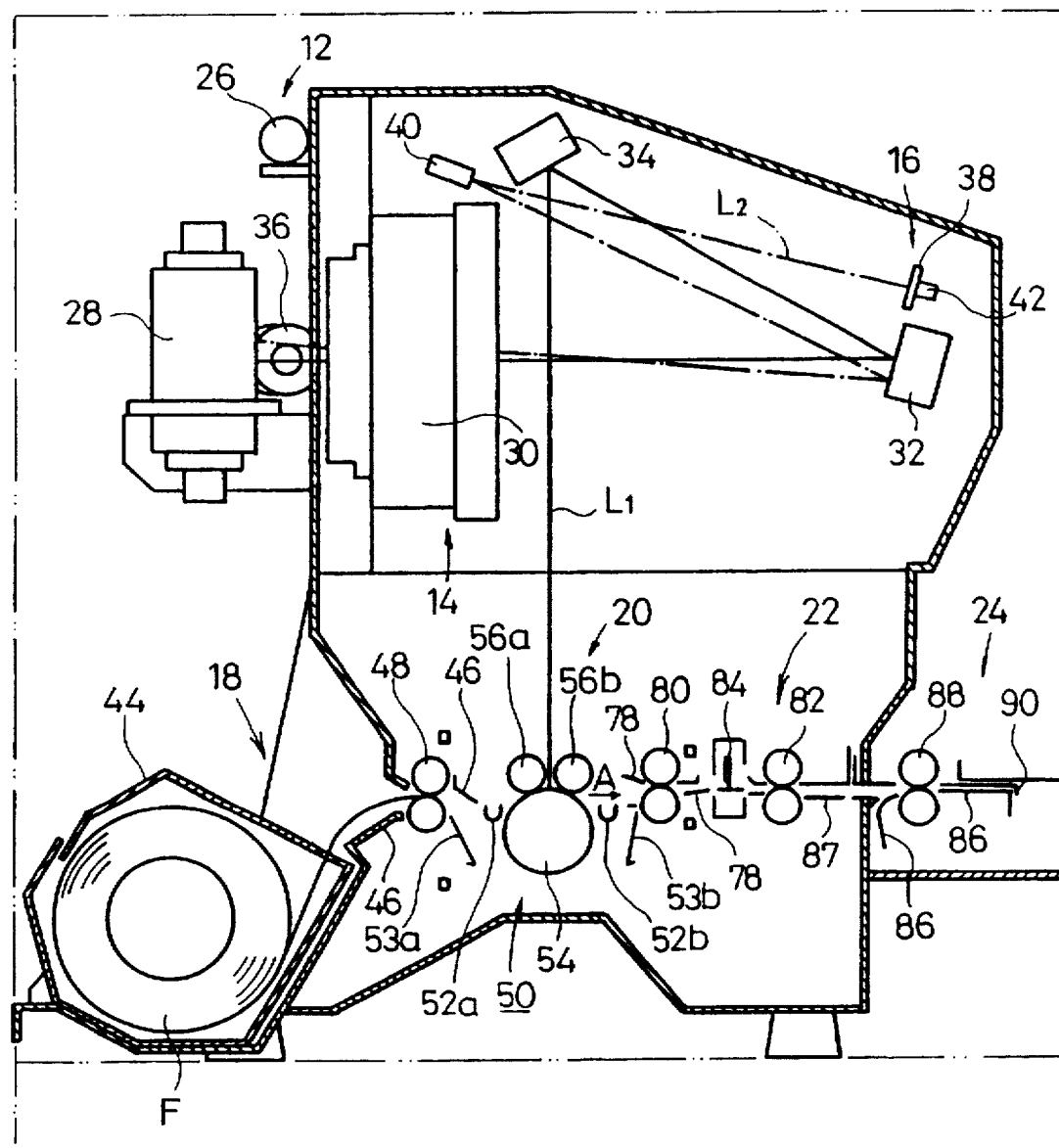
FIG. 1 is a schematic elevational view, partly in cross section, of a recording apparatus which incorporates a feed apparatus according to a first embodiment of the present invention.

FIG. 1 shows a recording apparatus 10 which incorporates a feed apparatus according to a first embodiment of the present invention. The recording apparatus 10 generally comprises a light beam generator 12 for emitting a recording light beam $L_1$ such as a laser beam or the like, a scanning optical system 14 for scanning a film (fed medium) F in a main scanning direction with the recording light beam $L_1$ emitted from the light beam generator 12, a synchronizing signal generator 16 for generating a synchronizing signal for controlling the position of the recording light beam $L_1$, a film supply unit 18 for unwinding the film F from a film roll, a recorder 20 for recording an image on the film F from the film supply unit 18, a film feeder and cutter 22 for feeding and cutting the film F with the image recorded thereon to a predetermined length, and a discharger 24 for delivering the cut film F to an image developing apparatus (not shown).

The light beam generator 12 has a recording light source 26 such as an He—Ne laser or the like for emitting the recording light beam $L_1$. The scanning optical system 14 has a resonant light deflector 28 for reflecting and deflecting the recording light beam $L_1$ generated by the light beam generator 12 in the main scanning direction, an fθ lens 30 as a scanning lens, and a pair of reflecting mirrors 32, 34 for applying the recording light beam $L_1$ that has passed through the fθ lens 30 onto the film F in the recorder 20.

The synchronizing signal generator 16 has a synchronizing light source 36 for generating a synchronizing light beam $L_2$, a reference grating 38 having a plurality of slits (not shown) for being scanned by the synchronizing light beam $L_2$ emitted from the synchronizing light source 36, a reflecting mirror 40 for leading the synchronizing light beam $L_2$ reflected by the reflecting mirror 32 toward the reference grating 38, and a photosensor 42 for photoelectrically reading the synchronizing light beam $L_2$ that has passed through the reference grating 38.

The film supply unit 18 has a magazine 44 for storing the roll of film F, a plurality of guide plates 46 for guiding the film F unwound from the magazine 44, and a first pair of feed rollers 48 for gripping the leading end of the film F and feeding the film F toward the recorder 20.

The recorder 20 has a feed apparatus 50 according to the first embodiment for feeding the film F in an auxiliary scanning direction (indicated by the arrow A) substantially perpendicular to the main scanning direction, a pair of winding guides 52a, 52b vertically movably disposed one on each side of the feed apparatus 50, and a pair of movable guide plates 53a, 53b disposed outwardly of the respective winding guides 52a, 52b for swinging movement in ganged relation to the winding guides 52a, 52b.

Figure 2:
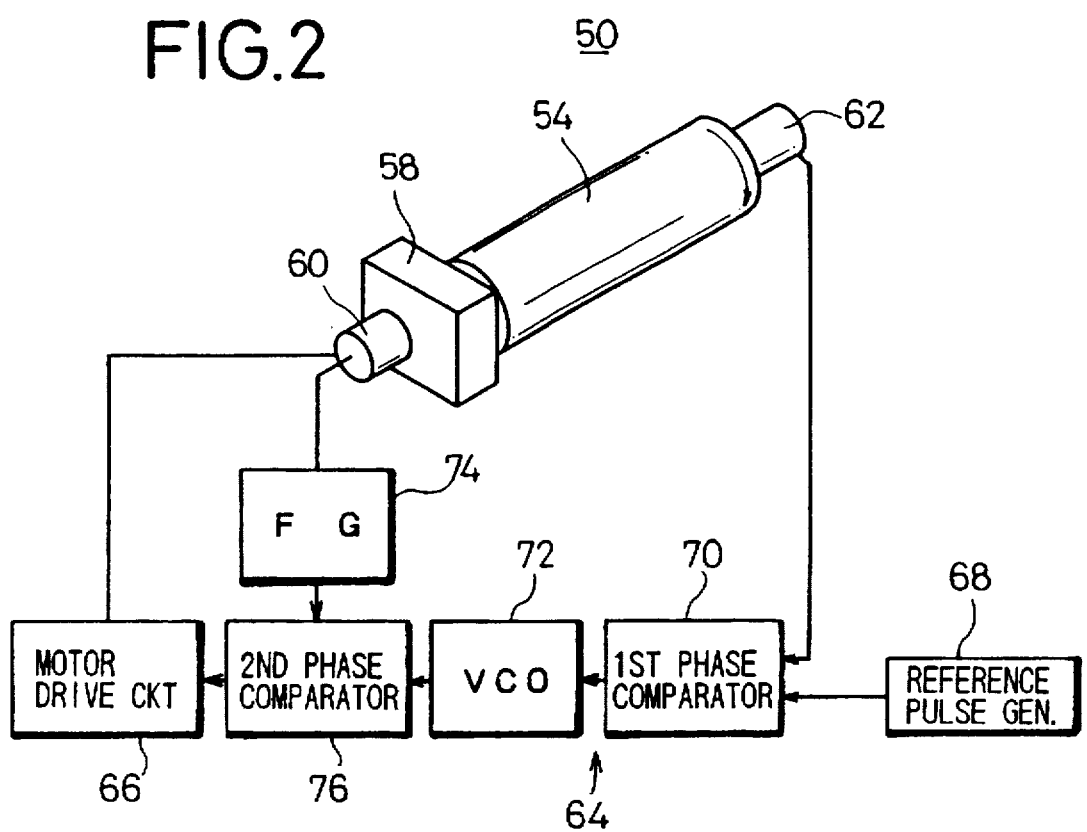
FIG. 2 is a perspective view, partly in block form, of the feed apparatus.

The feed apparatus 50 has a feed drum 54 of relatively large diameter and a pair of nip rollers 56a, 56b disposed above and movable toward and away from the feed drum 54. The feed drum 54 has a pair of coaxial shafts projecting from respective opposite ends thereof. As shown in FIG. 2, a motor 60 is coupled through a speed reducer unit (speed reducer mechanism) 58 to one of the shafts of the feed drum 54. The feed apparatus 50 also has a rotary encoder (drum rotation detector) 62 coupled to the other shaft of the feed drum 54 for directly detecting a rotating state of the feed drum 54, a control signal generator 64 for generating a motor control pulse signal (motor control signal) based on output pulses (detected signal) produced by the rotary encoder 62, and a motor drive circuit (motor driver) 66 for controlling the motor 60 based on the motor control pulse signal produced by the control signal generator 64.

The control signal generator 64 and the motor drive circuit 66 are controlled by a central processing unit (not shown).

The control signal generator 64 comprises a first phase comparator 70 for comparing a pulse signal outputted from the rotary encoder 62 and a reference pulse signal outputted from a reference pulse generator 68, and a voltage-controlled oscillator (VCO) 72 for outputting a motor control pulse signal based on a signal outputted from the first phase comparator 70.

A frequency generator (FG) 74 is mounted on the motor 60 as a motor rotation detector for detecting a rotating state of the motor 60, i.e., measuring the rotational speed of the motor 60 as a frequency. A frequency signal (detected signal) outputted from the frequency generator 74 and a motor control pulse signal outputted from the voltage-controlled oscillator 72 are supplied to and compared with each other by a second phase comparator 76, which is connected to the motor drive circuit 66.

As shown in FIG. 1, the film feeder and cutter 22 comprises a plurality of guide plates 78, a second pair of feed rollers 80 and a third pair of feed rollers 82 which are spaced a distance from each other, and a cutter unit 84 disposed between the second pair of feed rollers 80 and the third pair of feed rollers 82. The discharger 24 has a plurality of guide plates 86, a movable guide plate 87, a fourth pair of feed rollers 88, and a shutter 90 for selectively opening and closing a path which leads to the image developing apparatus.

If the feed drum 54 has its drum shafts positioned eccentrically or off-center, then the feed drum 54 is likely to feed the film F over a distance containing an error in the auxiliary scanning direction A. Particularly, when large-size color-separated films of four colors, i.e., cyan, magenta, yellow, and black (C, M, Y, BK) are produced by a succession of recording and cutting cycles using the recording apparatus 10 in a color platemaking process, the color-separated films tend to suffer respective different feed errors caused by the feed drum 54. When such feed errors occur, respective images on the color-separated films are out of register with each other when superimposed, resulting in a reduction in register accuracy.

Furthermore, the above problem is aggravated by thickness irregularities of the film F itself. If the film F has a thickness of 100 μm, then the thickness usually suffers a variation or error of about ±2 μm. Even when the film F is fed accurately in the auxiliary scanning direction by a precision auxiliary scanning feed mechanism, the distance L by which the film F is fed contains an error $\Delta L$ due to the thickness variation of the film F.

Figure 3:
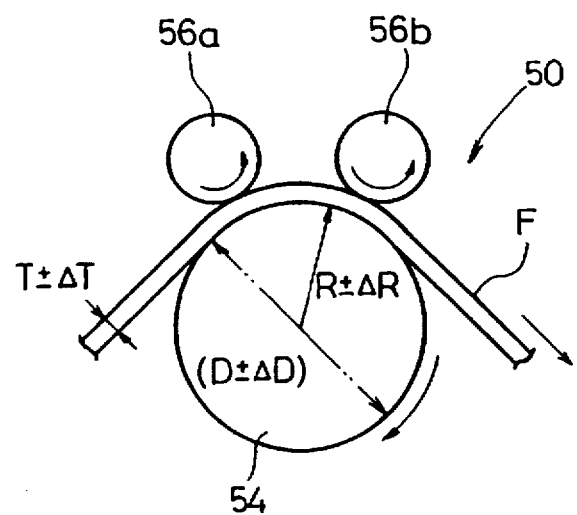
FIG. 3 is a front elevational view of a feed drum of the feed apparatus.

If it is assumed that the length of an image (in the auxiliary scanning direction) to be recorded on the film F is represented by L, a feed error in the auxiliary scanning direction of the film F is represented by $\Delta L$, the thickness variation of the film F is represented by $\Delta T$, the radius of the feed drum 54 is represented by R, and the eccentricity of the feed drum 54 with respect to the radius R is represented by $\Delta R$ (see FIG. 3), then these dimensions satisfy the following equation (1):

$$\Delta L/L = \{(T+2\Delta T)/2 + (R+2\Delta R)\}/(T/2+R) - 1 \qquad (1)$$

Therefore, the relationship between the diameter D of the feed drum 54 and the eccentricity $\Delta D$ (see FIG. 3) of the feed drum 54 with respect to the diameter D is expressed by:

$$\Delta D = \frac{1}{2}\{(T+D)\Delta L/L - 2\Delta T\}. \qquad (2)$$

If L=600 mm, $\Delta L$=30 μm, D=240 mm (R=120 mm), T=100 μm, and $\Delta T$=2 μm, then the eccentricity $\Delta D$ is calculated as $\Delta D = 4 \times 10^{-3}$ mm according to the equation (2). It can therefore be seen that the eccentricity $\Delta D$ of the feed drum 54 whose diameter D is 240 mm is required to be 4 μm or less.

According to this embodiment, as described above, the eccentricity $\Delta D$ of the feed drum 54 with respect to the diameter D is defined so as to satisfy the equation (2). The diameter D of the feed drum 54 may be determined according to the equation (2) from the eccentricity $\Delta D$ that can be achieved.

Operation of the recording apparatus 10 in relation to the feed apparatus 50 will be described below.

Figure 4:
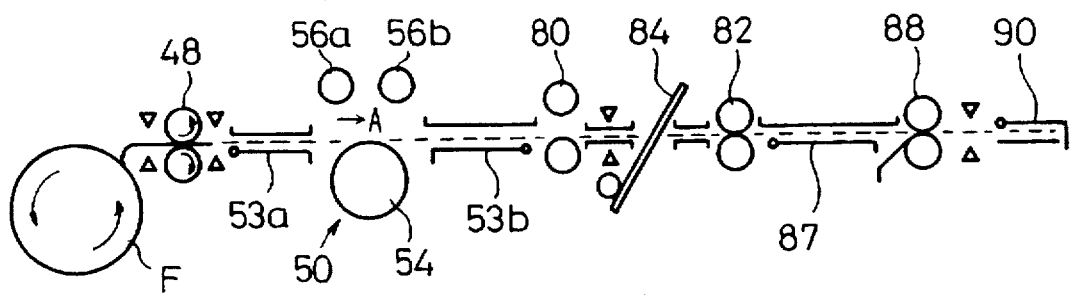
FIG. 4 is a schematic elevational view showing the manner in which the feed apparatus starts to operate.

The film F in the form of a roll is stored in the magazine 44, and the leading end of the film F is gripped by the first pair of feed rollers 48 (see FIG. 4). The nip rollers 56a, 56b are moved away from the feed drum 54. With the second pair of feed rollers 80 spaced from each other, the first pair of feed rollers 48 is rotated to unwind the film F from the magazine 44.

Figure 5:
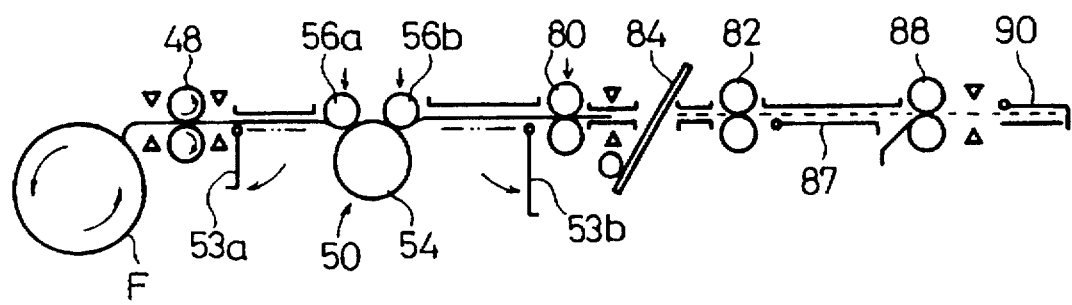
FIG. 5 is a schematic elevational view showing the manner in which the feed apparatus unwinds a film.

The film F is guided by the guide plates 46 and the movable guide plates 53a, 53b to move in the direction A until the leading end of the film F passes between the second pair of feed rollers 80 into a certain position whereupon, as shown in FIG. 5, the second pair of feed rollers 80 is displaced toward each other and the nip rollers 56a, 56b move toward the feed drum 54. Thus, the film F is gripped between the second pair of feed rollers 80 and also between the nip rollers 56a, 56b and the feed drum 54. The film F is wound around an outer circumferential surface of the feed drum 54 in a certain angular extent by the winding guides 52a, 52b (see FIG. 1). The movable guide plates 53a, 53b are swung downwardly.

Figure 6:
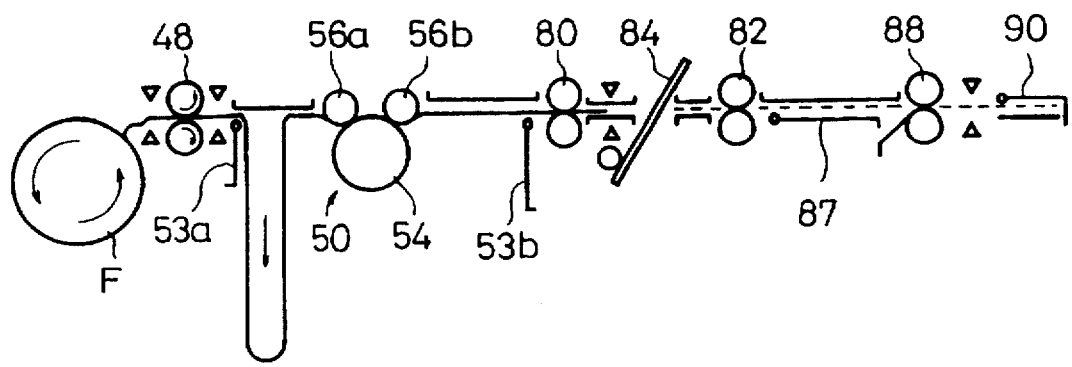
FIG. 6 is a schematic elevational view showing the manner in which the feed apparatus unwinds a film by a recording length.

When the film F is moved toward the recorder 20 upon rotation of the first pair of feed rollers 48, since the movable guide plate 53a has been retracted downwardly, a certain length of the film F, which is determined on account of a required recording length, is drawn downwardly as a loop between the feed drum 54 and the first pair of feed rollers 48, as shown in FIG. 6. The first pair of feed rollers 48 is now stopped against rotation, and the motor 60 of the feed apparatus 50 is energized. The rotation of the motor 60 is transmitted through the speed reducer unit 58 to the feed drum 54 for thereby rotating the feed drum 54 at a relatively low speed clockwise in the direction indicated by the arrow (see FIG. 7). The film F is now fed in the auxiliary scanning direction A while being gripped between the nip rollers 56a, 56b and the feed drum 54.

When the synchronizing light source 36 is energized, it emits a synchronizing light beam $L_2$. The synchronizing light beam $L_2$ is reflected and deflected in a main scanning direction by the resonant light deflector 28, and then is caused by the fθ lens 30 and the reflecting mirrors 32, 40 to scan the reference grating 38. The synchronizing light beam $L_2$ passes through the slits of the reference grating 38, and is applied as a pulsed light signal to the photosensor 42. The photosensor 42 then generates a synchronizing signal which is applied to energize the recording light source 26. The recording light source 26 generates a recording light beam $L_1$, which after being modulated by an image to be recorded, is reflected and deflected in the main scanning direction by the resonant light deflector 28. The recording light beam $L_1$ passes through the fθ lens 30 and is reflected by the reflecting mirrors 32, 34 to scan the film F which is being fed in the auxiliary scanning direction. Therefore, an image is two-dimensionally recorded on the film F based on the image information carried by the recording light beam $L_1$.

The rotational speed of the motor 60 is reduced to a considerably low rotational speed by the speed reducer unit 58, and the low-speed rotation is transmitted to the feed drum 54. For example, if the rotational speed of the motor 60 is 200 rpm, the rotational speed of the feed drum 54 is 0.7 rpm. The speed reducer unit 58 is liable to produce a feed rate error of the feed drum 54 in a low frequency range lower than 1 Hz. As the continuous recording length of the film F is larger, the deviation or positional error of a recorded image due to the feed rate error is also larger. For example, if the continuous recording length of the film F is 700 mm, then since the film F is continuously fed for a period of time ranging from 80 to 400 seconds, the deviation or positional error of an image recorded on the film is very large.

According to this embodiment, the rotary encoder 62 connected to the feed drum 54 produces a pulse signal in response to rotation of the feed drum 54, and the produced pulse signal is compared with a reference pulse signal from the reference pulse generator 68 by the first phase comparator 70. The first phase comparator 70 applies a signal (comparison signal) to the voltage-controlled oscillator 72, which outputs a motor control pulse signal that is applied through the second phase comparator 76 to the motor drive circuit 66 for thereby energizing the motor 60.

Consequently, the actual rotating state of the feed drum 54 whose eccentricity has been limited to a certain value or less is detected for feedback control of the motor 60 to rotate the feed drum 54 highly precisely at a constant speed. As a result, the accuracy of feeding rotation of the feed drum 54 is effectively maintained to feed the film F at an accurate rate in the auxiliary scanning direction. When four color-separated films that have been produced by the recording apparatus 10 in a color platemaking process are superimposed, the respective images recorded thereon are held in registry with each other, and hence the register accuracy is kept high.

Because the feed drum 54 can be rotated highly accurately regardless of the limited accuracy of the speed reducer unit 58, it is not necessary to manufacture the speed reducer unit 58 to high dimensional accuracy standards. Therefore, the cost of the feed apparatus 50 can easily be reduced.

Furthermore, the rotating state of the motor 60 is directly detected by the frequency generator 74, which applies a frequency signal (rotational speed signal) to the second phase comparator 76. The second phase comparator 76 compares the frequency signal with the motor control pulse signal from the voltage-controlled oscillator 72, and outputs a signal to the motor drive circuit 66. The motor drive circuit 66 can thus control the motor 60 to minimize rotational speed irregularities in a frequency range higher than 1 Hz, for example. Accordingly, the image recorded on the film F is of high quality and free of image irregularities which would otherwise be caused by such rotational speed irregularities of the motor 60.

Figure 7:
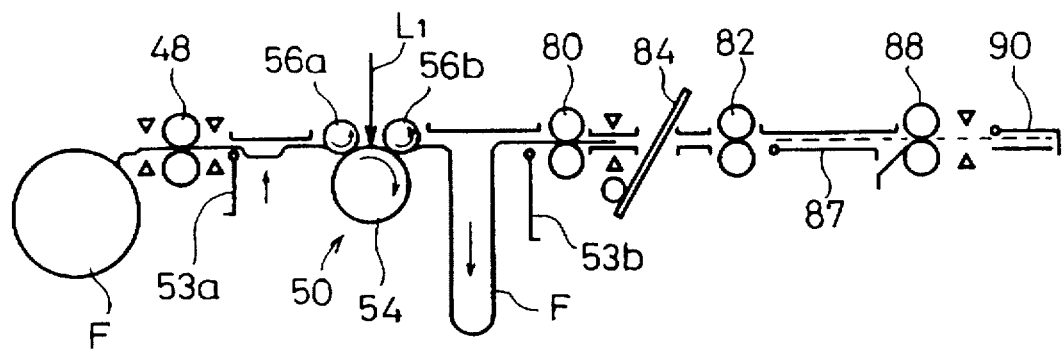
FIG. 7 is a schematic elevational view showing the feed apparatus in which an image is to be recorded on the film.
Figure 8:
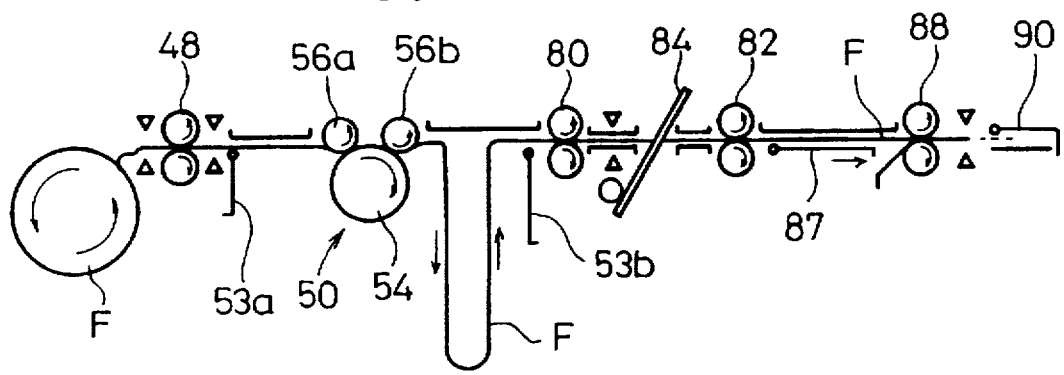
FIG. 8 is a schematic elevational view showing the feed apparatus in which the image has been recorded on the film.

When the image has been recorded on the film F as described above, the recorded length of film F is accommodated as a loop between the second pair of feed rollers 80 and the feed drum 54, as shown in FIG. 7. After the image recording process is finished, the first pair of feed rollers 48, the feed drum 54, the second pair of feed rollers 80, the third pair of feed rollers 82, and the fourth pair of feed rollers 88 are rotated to feed the film F until its leading end reaches a certain position near the shutter 90, as shown in FIG. 8.

Figure 9:
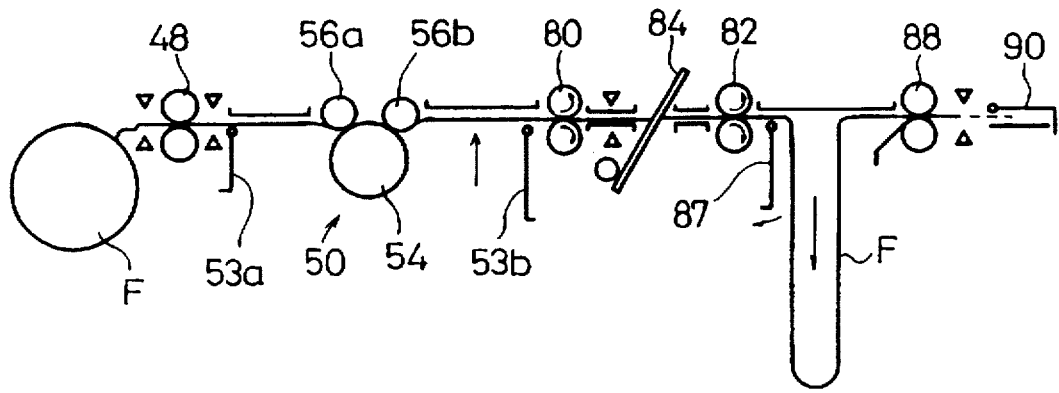
FIG. 9 is a schematic elevational view showing the feed apparatus in which the image has been recorded on the film.
Figure 10:
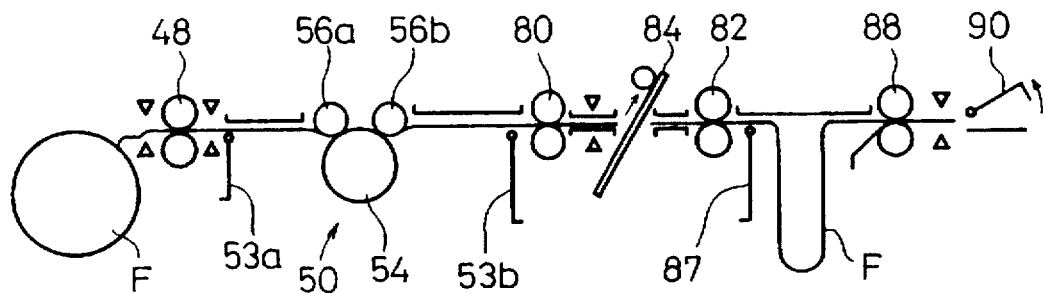
FIG. 10 is a schematic elevational view showing the feed apparatus in which the film with the recorded image is cut off.
Figure 11:
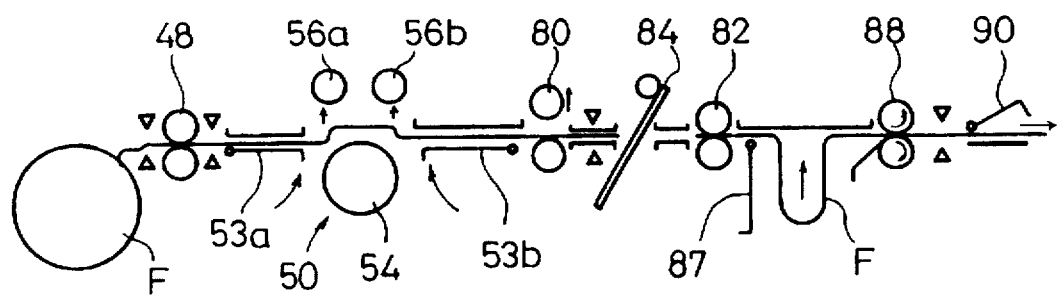
FIG. 11 is a schematic elevational view showing the manner in which the feed apparatus feeds the film with the recorded image toward an image developing apparatus.

Then, as shown in FIG. 9, the movable guide plate 87 is lowered, and the second pair of feed rollers 80 and the third pair of feed rollers 82 are rotated to accommodate the recorded length of film F, which has been accommodated between the second pair of feed rollers 80 and the feed drum 54, as a loop between the third pair of feed rollers 82 and the fourth pair of feed rollers 88. The cutter 84 is actuated to cut off the film F to a predetermined length (see FIG. 10), and the shutter 90 is opened to allow the recorded length of film F to be fed toward the image recording apparatus by the fourth pair of feed rollers 88, as shown in FIG. 11. At the same time, the second pair of feed rollers 80 is spaced from each other and the nip rollers 56a, 56b are spaced from the feed drum 54.

Figure 12:
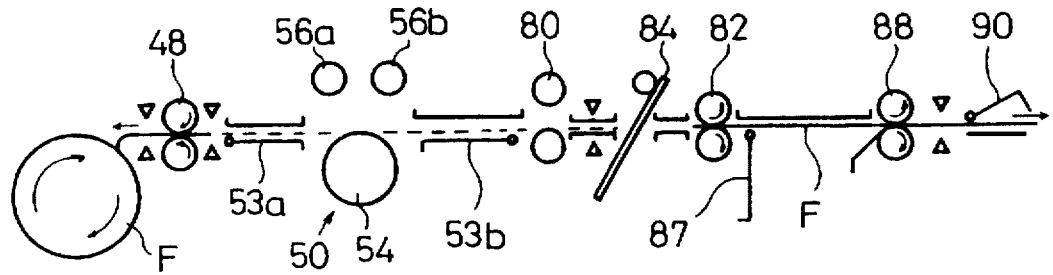
FIG. 12 is a schematic elevational view showing the manner in which the feed apparatus feeds the film with the recorded image toward an image developing apparatus and returns an unrecorded portion of the film.

The first pair of feed rollers 48 is reversed to return the unrecorded film F toward the magazine 44, and the third pair of feed rollers 82 and the fourth pair of feed rollers 88 are rotated to introduce the recorded length of film F into the image recording apparatus, as shown in FIG. 12. The shutter 90 is then closed. The parts of the feed apparatus 50 are now in the condition shown in FIG. 7 in readiness for a next recording process.

In this embodiment, the feed apparatus 50 has been described with respect to a color platemaking process for producing four color-separated films. However, the principles of the present invention are also applicable to a process of recording an image on a single film for black-and-white platemaking, or a process of recording images of four colors on a single film for color platemaking and dividing the film into four plates. The feed apparatus 50 may be incorporated in a reading apparatus in which a light beam is applied to a film with image information recorded thereon to photoelectrically read the recorded image information from the film.

In the first embodiment, the relative feed error of the film F is lowered. It should be noted that the feed apparatus 50 is arranged to lower the relative feed error of the film F by reducing the absolute feed error thereof. Problems are posed by not only a relative feed error but also an absolute feed error in a process of making plates from a single film on which images are recorded. The arrangement according to the first embodiment is preferable for the reduction of such an absolute feed error.

(2nd Embodiment)

Figure 13:
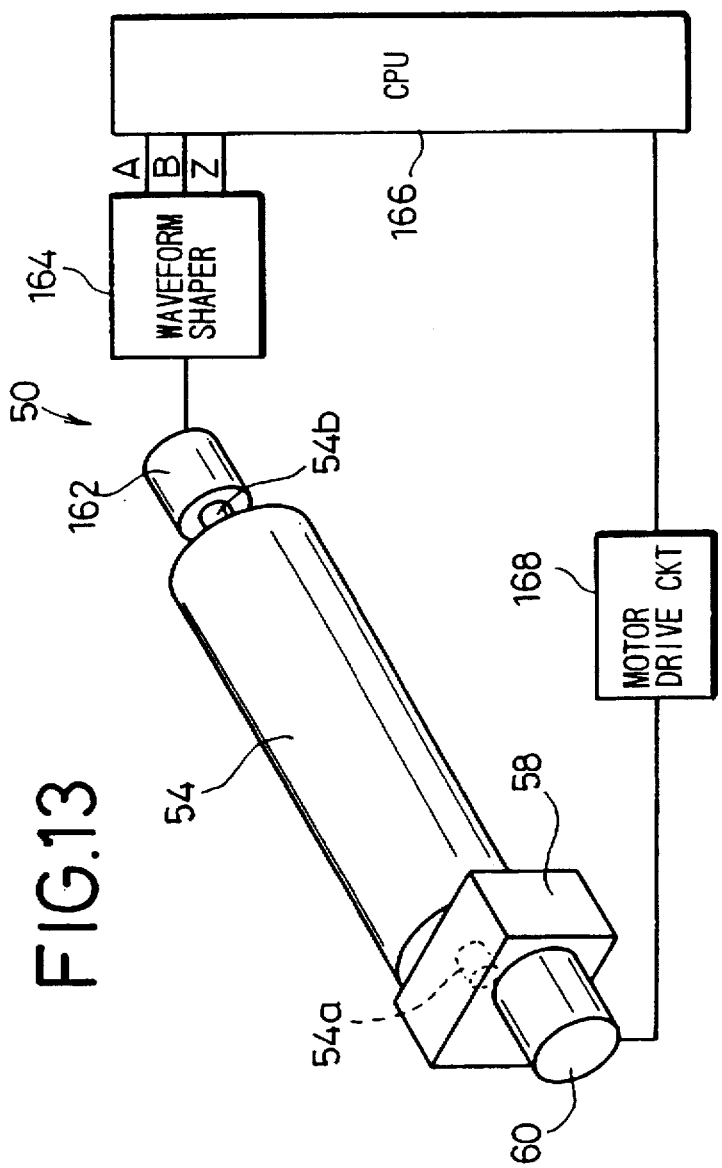
FIG. 13 is a perspective view, partly in block form, of a feed apparatus according to a second embodiment of the present invention.

FIG. 13 shows a feed apparatus 50 according to a second embodiment of the present invention. As shown in FIG. 13, the feed apparatus 50 according to the second embodiment has a rotary encoder 162 (rotary encoder with a zero point) for outputting an original position signal (hereinafter referred to as a Z-phase position signal), a central processing unit (CPU) 166, and associated components and circuits, rather than the rotary encoder 62 and the motor control circuit 66 shown in FIG. 2. Those parts shown in FIG. 13 which are identical to those shown in FIG. 2 are denoted by identical reference numerals, and will not be described in detail below.

As shown in FIG. 13, a motor 60 is connected through a speed reducer unit 58 to a drum shaft 54a of a feed drum 54, and a rotary encoder 162 is connected to an opposite drum shaft 54b of the feed drum 54 for detecting whether the feed drum 54 is in a predetermined original angular position. To the rotary encoder 162, there is connected a waveform shaper 164 having output terminals connected to the central processing unit 166. The central processing unit 166 outputs a motor control signal to a motor drive circuit 168, which energizes the motor 60 based on the motor control signal. The central processing unit 166 and the motor drive circuit 168 jointly serve as a control means. The frequency generator 74 and the second phase comparator 76 according to the first embodiment are omitted from the second embodiment.

Figure 14:
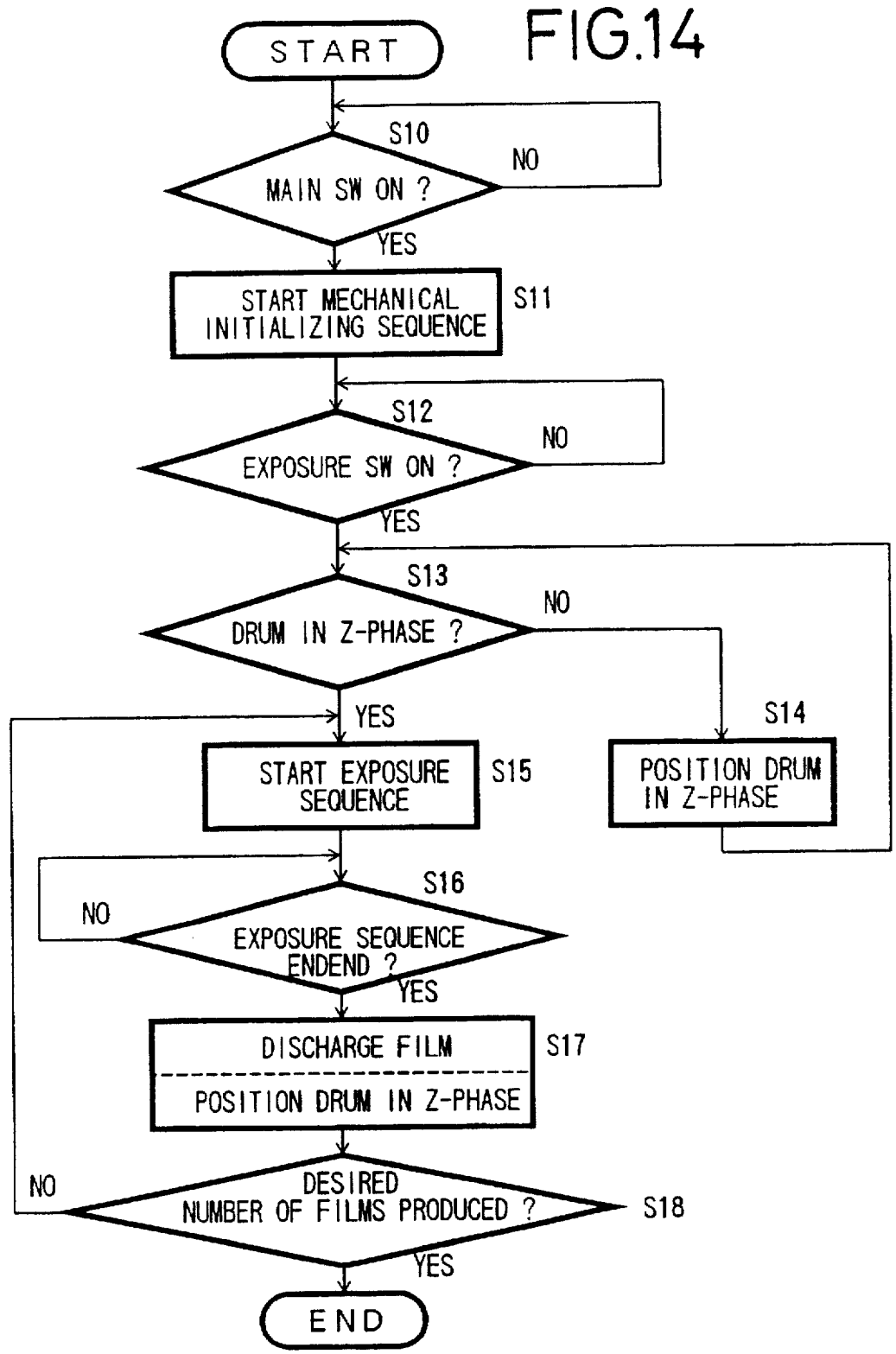
FIG. 14 is a flowchart of an operation sequence of the feed apparatus according to the second embodiment.

Operation of the feed apparatus 50 according to the second embodiment will be described below with reference to FIG. 14.

The film F in the form of a roll is stored in the magazine 44 (see FIG. 1), and the leading end of the film F is gripped by the first pair of feed rollers 48. When a main switch (not shown) of the recording apparatus 10 is turned on (YES in a step S10 shown in FIG. 14), a mechanical initializing sequence is started in a step S11. The mechanical initializing sequence includes a Z-phase positioning sequence for the feed drum 54.

Figure 15:
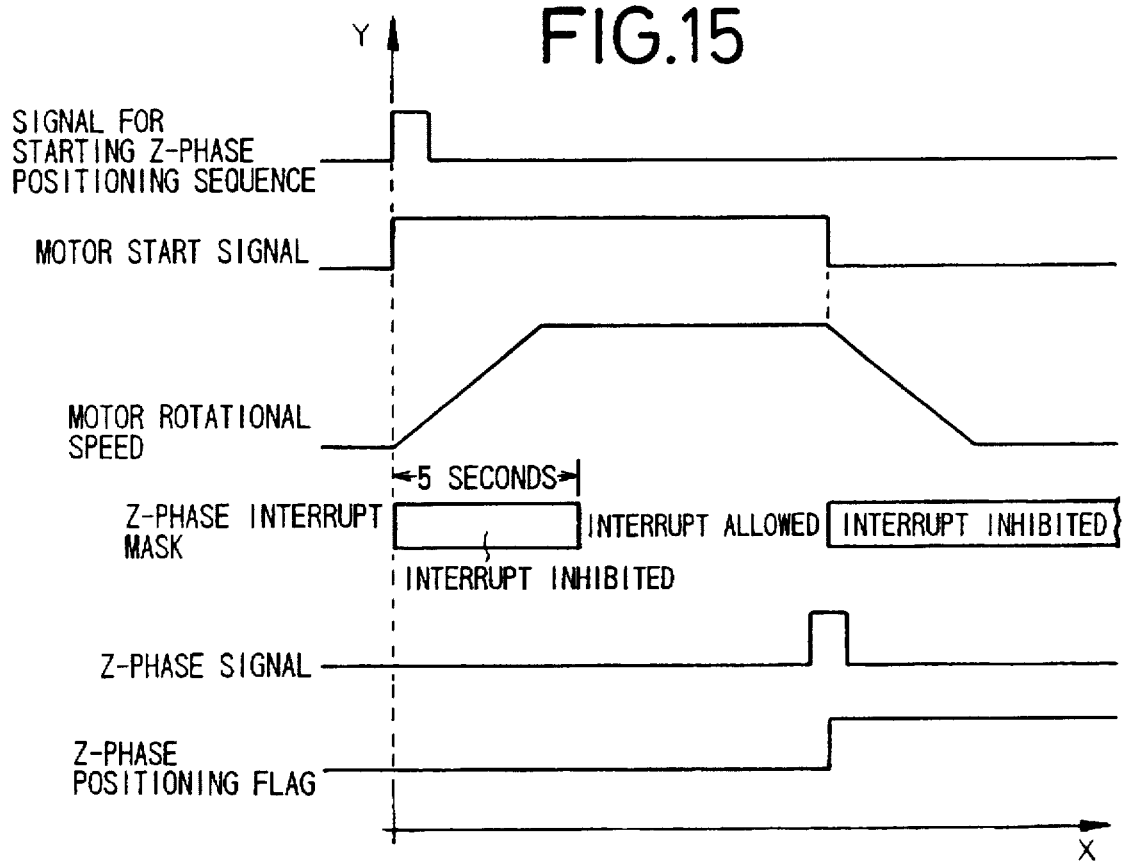
FIG. 15 is a timing chart of a Z-phase positioning process for a feed drum.
Figure 16:
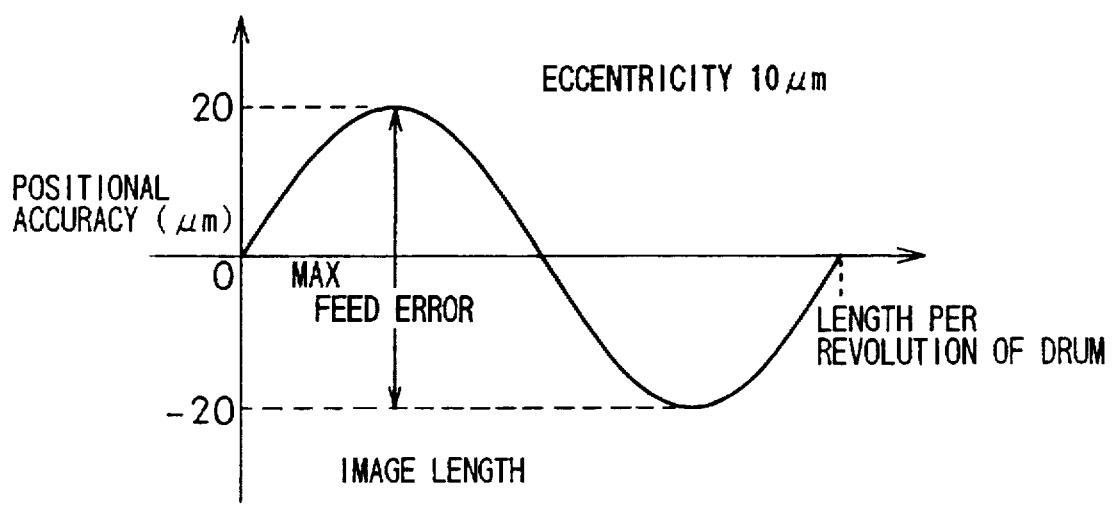
FIG. 16 is a diagram showing the relationship between the eccentricity and feed error of a feed drum.

More specifically, as shown in FIG. 15, when a signal for starting the Z-phase positioning sequence is issued, the central processing unit 166 outputs a motor start signal to the motor drive circuit 168 to start energizing the motor 60. Since the rotational speed of the motor is not stable for five seconds after the start of the motor 60, an interrupt for the Z-phase positioning sequence is inhibited by a Z-phase interrupt mask for five seconds after the start of the motor 60. When a Z-phase signal (pulse signal) from the rotary encoder 162 is shaped into a pulse signal by the waveform shaper 164 and applied to the central processing unit 166, the central processing unit 166 applies a motor shutdown signal to the motor drive circuit 168. At this time, the feed drum 54 is not stopped in synchronism with the Z-phase signal from the rotary encoder 162, but is stopped in a position taking into account an overrun after the motor 60 is de-energized. The position in which the feed drum 54 is thus stopped is established as a reference position or original position for starting to scan the film F with the recording light beam $L_1$.

After the mechanical initializing sequence, when an exposure switch is turned on (YES in a step S12), it is determined in a step S13 whether the feed drum 54 is positioned in a Z-phase (reference or original position). If not, then the Z-phase positioning sequence is carried out again in a step S14. If positioned in the Z-phase (YES in the step S13), then an exposure sequence is started in a step S15.

Those steps which follow the exposure sequence are identical to the corresponding operation described above with reference to the first embodiment, and will not be described in detail below. In the second embodiment, however, the step of discharging the recorded length of film F toward the image developing apparatus after the exposure sequence and the step of positioning the feed drum 54 into the Z-phase are simultaneously carried out in a step S17.

In the second embodiment, when first through fourth color-separated films start being successively generated, the feed drum 54 is positioned precisely in the reference position based on the Z-phase signal from the rotary encoder 162. Therefore, the feed drum 54 is held in the reference position at the time of starting the process of generating each of the first through fourth color-separated films. Since the light beam starts scanning each color-separated film from the same reference position (original angular position) of the feed drum 54, if the feed drum 54 is suffering an eccentricity error, then each color-separated film is affected by the same eccentricity error. Consequently, images are recorded under the same conditions on the respective four color-separated films. When the produced four color-separated films are superimposed, their images are held in registry with each other, resulting in high registry accuracy.

Inasmuch as the feed apparatus 50 according to the second embodiment is of a simple arrangement which employs the rotary encoder 162 capable of outputting a Z-phase signal, the feed apparatus 50 can effectively be lowered in cost and reduced in size.

The Z-phase positioning sequence for the feed drum 54 is carried out in the mechanical initializing sequence in the step S11 simultaneously with the discharge of the film F in the step S17. As a result, the time required to prepare for an exposure sequence is made shorter for more efficient recording operation than would be if the feed drum 54 were positioned in the Z-phase immediately before the exposure sequence.

Although certain preferred embodiments of the present invention has been shown and described in detail, it should be understood that various changes and modifications may be made therein without departing from the scope of the appended claims.

What is claimed is:

1. A feed apparatus for feeding a scanned medium in an auxiliary scanning direction comprising:

a motor;

a speed reducer mechanism coupled to said motor;

a feed drum coupled to said speed reducer mechanism for being rotated by said motor through said speed reducer mechanism to feed the scanning medium in the auxiliary scanning direction, wherein said feed drum has an eccentricity set to at most a predetermined value which is determined in view of an allowable feed error of the scanned medium in the auxiliary scanning direction and a thickness variation of the scanned medium;

a drum rotation detector for detecting a rotating state of said feed drum;

a control signal generator for generating a motor control signal based on a signal outputted from said drum rotation detector;

a motor rotation detector for detecting a rotating state of said motor;

a motor controller for controlling said motor based on the motor control signal generated by said control signal generator and a detected signal outputted from the motor rotation detector; and a central processing unit for controlling said control signal generator and said motor controller in order to keep a relative feed error at an optional position of the scanned medium, which is fed by said feed drum below, a predetermined level.

2. A feed apparatus according to claim 1, wherein said predetermined value is calculated according to the following equation:

$$\Delta D = \tfrac{1}{2}\{(T+D)\Delta L/L - 2\Delta T\}$$

where $\Delta D$ represents said predetermined value, L the length of the scanned medium in the auxiliary scanning direction, $\Delta L$ the allowable feed error of the scanned medium in the auxiliary scanning direction, T the thickness of the scanned medium, and $\Delta T$ the thickness variation of the scanned medium.

3. A feed apparatus for feeding a scanned medium in an auxiliary scanning direction, comprising:

a motor;

a speed reducer mechanism coupled to said motor;

a feed drum, with an eccentricity set to at most a predetermined value which is determined in view of an allowable feed error of the scanned medium in the auxiliary scanning direction and a thickness variation of the scanned medium, coupled to said speed reducer mechanism for being rotated by said motor through said speed reducer mechanism to feed the scanning medium in the auxiliary scanning direction;

a drum rotation detector for detecting a rotating state of said feed drum;

a control signal generator for generating a motor control signal based on a signal outputted from said drum rotation detector;

a motor controller for controlling said motor based on the motor control signal generated by said control signal generator; and a central processing unit for controlling said control signal generator and said motor controller in order to keep a relative feed error at an optional position of the scanned medium, which is fed by said feed drum, below a predetermined level.

4. A feed apparatus according to claim 3, wherein said predetermined value is calculated according to the following equation:

$$\Delta D = \tfrac{1}{2}\{(T+D)\Delta L/L - 2\Delta T\}$$

where $\Delta D$ represents said predetermined value, L the length of the scanned medium in the auxiliary scanning direction, $\Delta L$ the allowable feed error of the scanned medium in the auxiliary scanning direction, T the thickness of the scanned medium, and $\Delta T$ the thickness variation of the scanned medium.

5. A feed apparatus according to claim 3, wherein said drum rotation detector comprises a rotary encoder, and said control signal generator comprises a phase comparator for comparing a pulse signal outputted from said rotary encoder and a reference pulse signal with each other, and an oscillator for generating said motor control signal based on a signal outputted from said phase comparator.

* * * * *